(12) United States Patent
Weiberle et al.

(10) Patent No.: US 9,969,375 B2
(45) Date of Patent: May 15, 2018

(54) BRAKE BOOSTER DEVICE FOR A BRAKING SYSTEM OF A VEHICLE, AND METHOD FOR MANUFACTURING A BRAKE BOOSTER DEVICE FOR A BRAKING SYSTEM OF A VEHICLE

(75) Inventors: Reinhard Weiberle, Vaihingen/Enz (DE); Karl-Heinz Willmann, Freiberg (DE); Andreas Birkheim, Cologne (DE); Matthias Kistner, Bretzfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1026 days.

(21) Appl. No.: 14/347,528

(22) PCT Filed: Aug. 7, 2012

(86) PCT No.: PCT/EP2012/065408
§ 371 (c)(1),
(2), (4) Date: Aug. 8, 2014

(87) PCT Pub. No.: WO2013/045154
PCT Pub. Date: Apr. 4, 2013

(65) Prior Publication Data
US 2014/0345270 A1     Nov. 27, 2014

(30) Foreign Application Priority Data
Sep. 30, 2011  (DE) ........................ 10 2011 083 815

(51) Int. Cl.
B60T 13/565     (2006.01)
B60T 11/20      (2006.01)
B60T 11/224     (2006.01)

(52) U.S. Cl.
CPC ............. *B60T 13/565* (2013.01); *B60T 11/20* (2013.01); *B60T 11/224* (2013.01); *B60T 2201/03* (2013.01); *Y10T 29/49236* (2015.01)

(58) Field of Classification Search
CPC ...... B60T 11/20; B60T 13/565; B60T 11/224; B60T 7/042; B60T 11/16; B60T 13/165
(Continued)

(56) References Cited

U.S. PATENT DOCUMENTS 2,341,318 A * 2/1944 Forbes ................. B60T 11/224
                                              417/216
3,559,406 A    2/1971 Gardner Delbert
(Continued)

FOREIGN PATENT DOCUMENTS

CN       101242978 A    8/2008
CN       102042357 A    5/2011
(Continued)

OTHER PUBLICATIONS

International Search Report for PCT/EP2012/065408, dated Dec. 21, 2012.

*Primary Examiner* — Michael Leslie
*Assistant Examiner* — Richard Drake
(74) *Attorney, Agent, or Firm* — Norton Rose Fulbright US LLP; Gerard Messina

(57) ABSTRACT

A brake booster device for a braking system of a vehicle includes: a booster body to which a brake-boosting force is exertable by an actuator device; a first piston rod component to which the brake-boosting force is at least partially transmittable via a first contact with the booster body, the first piston rod component contacting the booster body at a first contact surface such that the first piston rod component is at least partially adjustable; and a second piston rod component to which the brake-boosting force is at least partially transmittable via a second contact with the booster body, the second piston rod component contacting the booster body at a second contact surface such that the second piston rod component is adjustable together with the first piston rod component.

15 Claims, 5 Drawing Sheets

(58) Field of Classification Search
USPC .......... 29/888.02; 60/533, 547.1; 303/114.1
See application file for complete search history.

(56) References Cited

U.S. PATENT DOCUMENTS

| | | | | |
|---|---|---|---|---|
| 4,505,116 | A * | 3/1985 | Weiler | B60T 11/203 60/547.1 |
| 8,459,753 | B2 * | 6/2013 | Vollert | B60T 13/745 303/114.1 |
| 8,899,696 | B2 * | 12/2014 | Weiberle | B60T 1/10 303/113.4 |
| 9,267,377 | B2 * | 2/2016 | Weiberle | B60L 7/18 |
| 2009/0261649 | A1 * | 10/2009 | Higuma | B60T 8/4275 303/113.3 |
| 2012/0192556 | A1 * | 8/2012 | Verhagen | B60T 8/38 60/585 |
| 2015/0321651 | A1 * | 11/2015 | Lhuillier | B60T 11/203 60/533 |

FOREIGN PATENT DOCUMENTS

| | | |
|---|---|---|
| DE | 10 2009 047263 | 6/2010 |
| EP | 2 085 278 | 8/2009 |
| JP | H06501220 | 2/1994 |
| WO | 2010069740 A1 | 6/2010 |
| WO | 2011012345 A1 | 2/2011 |

* cited by examiner

BRAKE BOOSTER DEVICE FOR A BRAKING SYSTEM OF A VEHICLE, AND METHOD FOR MANUFACTURING A BRAKE BOOSTER DEVICE FOR A BRAKING SYSTEM OF A VEHICLE

BACKGROUND OF THE INVENTION

1. Field of the Invention

The present invention relates to a brake booster device for a braking system of a vehicle, a power booster for a braking system of a vehicle and a braking system for a vehicle, and a method for manufacturing a brake booster device for a braking system of a vehicle, a power booster of a braking system of a vehicle and a braking system of a vehicle.

2. Description of the Related Art

A brake booster is described in published German patent application document DE 10 2009 047 263 A1. The electromechanical brake booster may be used to exert a brake-boosting force on a booster body in such a way that through movement of the booster body, the brake-boosting force may be at least partially transmitted to an output element having a push rod in such a way that the push rod is insertable at least partially into a brake master cylinder

BRIEF SUMMARY OF THE INVENTION

The first piston rod component and/or the second piston rod component may be a piston rod. It is noted, however, that the first piston rod component and the second piston rod component are not limited to a design as a piston rod. In particular, the design of the first piston rod component and/or the second piston rod component is not limited to a particular type of piston rod.

Moreover, the first piston rod component and/or the second piston rod component may also be designed as contact part(s) for one piston rod respectively. In this case, the first piston rod component and/or the second piston rod component may be designed to each transmit a force independently of one another to a piston rod mounted or mountable thereon in such a way that the piston rod is adjustable with the aid of the transmitted force in such a way that the pressure volume of the brake master cylinder which may be filled with fluid is reducible.

The first piston rod component and/or the second piston rod component may be designed as a single piece/single part. Likewise, the first piston rod component and/or the second piston rod component may also be constructed of multiple subunits assembled together. The use of the term "component" does not limit the design of the first piston rod component and/or the second piston rod component to a single piece design.

The present invention implements a separation/subdivision of a piston rod component (primary piston) insertable into a pressure chamber of the brake master cylinder into different segments/pistons/bolt components. An incremental brake boosting is made possible with the aid of the implemented separation. In particular, the brake application surface leading into the brake master cylinder may be varied in this way.

In one advantageous specific embodiment, the brake booster device includes an input rod component on which a brake actuation element is mountable in such a way that a driver braking force exerted on the brake actuation element is transmittable to the input rod component. Preferably, the input rod component is at least temporarily in contact with the first piston rod component in such a way that the driver braking force is at least partially transmittable to the first piston rod component, while an at least partial transmission of the driver braking force to the second piston rod component is prevented. This configuration of the brake booster device has the advantage that during an operation the brake-boosting force may be applied in part directly for increasing the internal pressure present in the brake master cylinder to the second piston rod component, while a part of the brake-boosting force is exerted on the first piston rod component for the purpose of boosting the brake actuation by the driver.

Preferably, when an actuator device is present in the deactivated state, the first piston rod component is adjustable with the aid of the driver braking force to which the latter is at least partially transmitted. In the event the actuator device is functionally impaired, such as, for example, if the actuator device malfunctions, a hydraulic transmission is then activated which, when a driver braking force is applied by the driver, results in a greater increase in the internal pressure in the brake master cylinder, as compared to the related art. This may also be described as the brake booster device still being usable as a volume booster in the event the actuator device becomes functionally impaired.

For example, the second piston rod component may have a continuous recess, the first piston rod component being positioned for adjustable movement at least partially within the continuous recess. Thus, the two piston rod components may be inserted in a simple manner through an opening of the brake master cylinder.

As an alternative, the first piston rod component is insertable in an adjustment direction through a first opening of a brake master cylinder, the second piston rod component being movable in the adjustment direction through a second opening of the brake master cylinder. As explained in greater detail below, such an assembly and configuration of the two piston rod components allows for an advantageous design of the brake master cylinder.

The aforementioned advantages are ensured in a power booster for a braking system of a vehicle which has such a brake booster device and a brake master cylinder.

In one advantageous specific embodiment, the first piston rod component and the second piston rod component may protrude into a first pressure chamber of the brake master cylinder in such a way that a first residual volume of the first pressure chamber fillable with a fluid is variable with the aid of an adjustment of the first piston rod component and/or the second piston rod component, the brake master cylinder including a second pressure chamber into which a floating piston component protrudes in such a way that a second residual volume of the second pressure chamber fillable with a fluid is variable with the aid of an adjustment of the floating piston component. Thus, the advantageous power booster may also be equipped with a tandem brake master cylinder. The advantageous power booster is therefore useful for a number of different brake circuit designs.

Alternatively or in addition, the first piston rod component may protrude into a first partial pressure chamber of the brake master cylinder in such a way that a partial residual volume of the first partial pressure chamber fillable with a fluid is variable with the aid of an adjustment of the first piston rod component, the second piston rod component protruding into a second partial pressure chamber of the brake master cylinder, which is separated from the first partial pressure chamber by a continuous or discontinuous partition in such a way that a second partial residual volume of the second partial pressure chamber fillable with a fluid is variable with the aid of an adjustment of the second piston rod component. Such a configuration of the brake master cylinder allows for greater freedom of design.

The advantages described above are also achieved in a corresponding braking system having at least one brake circuit and one brake booster device and one brake master cylinder, and one corresponding power booster.

In addition, the advantages are also implemented in a corresponding method for manufacturing a brake booster device for a braking system of a vehicle.

The advantages also result from carrying out a method for manufacturing a power booster of a braking system of a vehicle.

Furthermore, the advantages are implementable by carrying out a corresponding method for manufacturing a braking system of a vehicle.

DETAILED DESCRIPTION OF THE INVENTION

Figure 1:
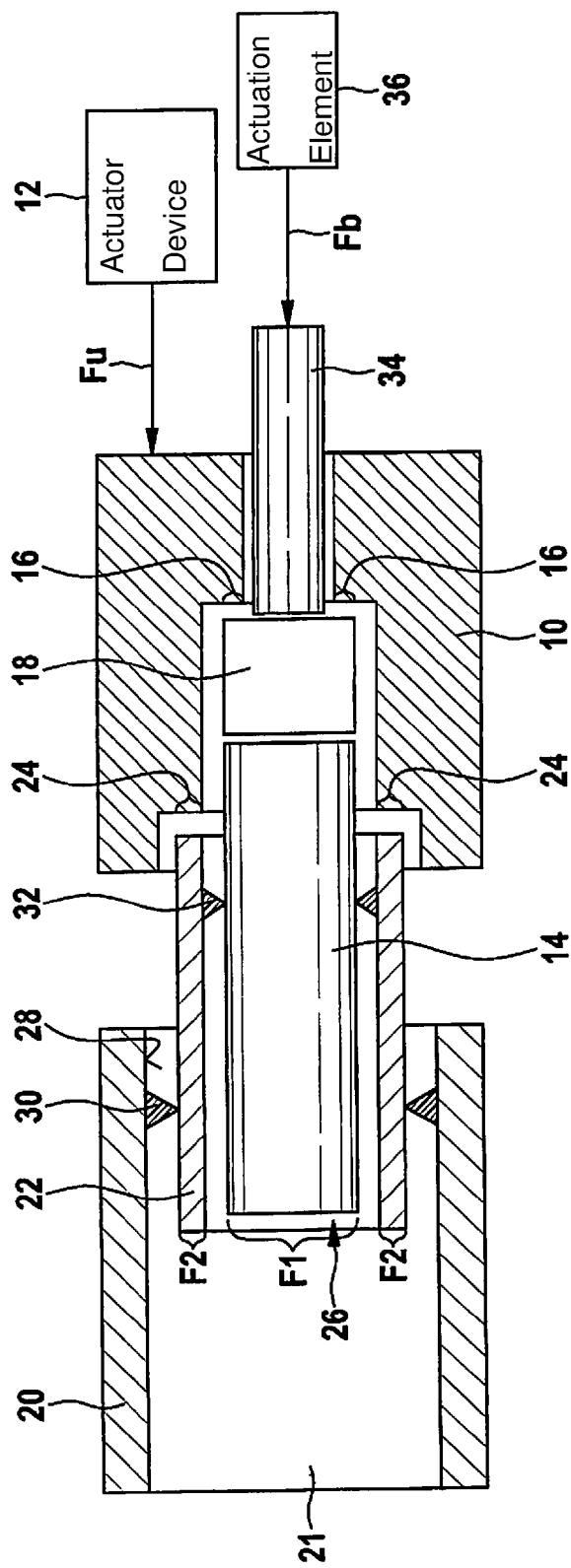
FIG. 1 shows a schematic representation of one first specific embodiment of the brake booster device.

FIG. 1 shows a schematic representation of one first specific embodiment of the brake booster device.

The brake booster device schematically illustrated in FIG. 1 is usable in a (hydraulic) braking system of a vehicle. The brake booster device includes a booster body 10, to which a brake-boosting force Fu is exertable with the aid of an actuator device 12 in such a way that booster body 10 is adjustable with the aid of brake-boosting force Fu. Booster body 10 may be designed as a valve body, for example. However, the design of booster body 10 is relatively freely variable for an advantageous interaction with actuator device 12. Actuator device 12 may, for example, be an electromechanical device or a hydraulic device. The design of actuator device 12 is not limited to these cited examples, however.

The brake booster device also includes one first piston rod component 14. First piston rod component 14 is positioned relative to booster body 10 in such a way that brake-boosting force Fu is at least partially transmittable to first piston rod component 14. Brake-boosting force Fu may be transmitted, for example, via a first force-transmitting contact between first piston rod component 14 contacting a first contact surface of the booster body and booster body 10. Alternatively, the first force-transmitting contact for at least partially transmitting brake-boosting force Fu may also take place by way of one first connecting component 18 which contacts first piston rod component 14 and first contact surface 16 of booster body 10. First connecting component 18 may, for example, be a reaction disk. The design of first connecting component 18 is not limited to a reaction disk, however.

The at least partial transmission of brake-boosting force Fu via the first force-transmitting contact may be carried out in such a way that first piston rod component 14 is adjustable. In particular, if first piston rod component 14 is positioned on a brake master cylinder 20, a volume in brake master cylinder 20 fillable with a fluid is reducible (in size) with the aid of the at least partial transmission of brake-boosting force Fu for the purpose of adjusting first piston rod component 14.

The brake booster device further includes one second piston rod component 22, to which brake-boosting force Fu is at least partially transmittable via one second force-transmitting contact in such a way that second piston rod component 22 is adjustable together with first piston rod component 14. A volume in brake master cylinder 20 fillable with a fluid is also reducible (in size) with the aid of the at least partial transmission of brake-boosting force Fu for the purpose of adjusting second piston rod component 22. The second force-transmission contact may take place between second piston rod component 22 contacting a second contact surface 24 of booster body 10 and booster body 10. Alternatively, the second force-transmission contact may also take place between second piston rod component 22 and booster body 10 via a second connecting component (not delineated) which contacts second contact surface 24 of booster body 10.

In one advantageous specific embodiment, first piston rod component 14 and/or second piston rod component 22 may be designed as piston rods. In particular, first piston rod component 14 and second piston rod component 22 may be positioned or is/are positionable on brake master cylinder 20 in such a way that first piston rod component 14 and second piston rod component 22 delimit a variable (in terms of size) pressure chamber 21 of brake master cylinder 20. Hence, first piston rod component 14 and/or second piston rod component 22 may be designated as brake master cylinder-primary piston and/or brake master cylinder-piston rod/partial piston rod. The feasibility of piston rod components 14 and 22 is not limited to a particular rod or piston shape, however.

It is noted that first piston rod component 14 and second piston rod component 22 are not restricted to a design as piston rods. Instead, first piston rod component 14 and/or second piston rod component 22 may also be designed as contact parts, one for each piston rod. In such a case, first piston rod component 14 and/or second piston rod component 22 may also be designed to transmit each independently of one another a force to one piston rod each positioned or positionable thereon in such a way that the piston rod is adjustable with the aid of the transmitted force in such a way that a pressure volume of brake master cylinder 20 fillable with fluid is reducible.

First piston rod component 14 and/or second piston rod component 22 may be designed as a single piece/single part. Likewise, first piston rod component 14 and/or second piston rod component 22 may be constructed of multiple assembled subunits.

First contact surface 16 may also be understood to mean multiple partial surfaces separated from one another. Accordingly, second contact surface 24 may also be subdivided into multiple partial surfaces separated from one another. (The term "contact surface" is used in the singular merely for the sake of clarity.) It is noted, however, that first contact surface 16 and second contact surface 24 are understood to mean different (overall) surfaces. This may also be described as two contact surfaces 16 and 24 at most touching, but not overlapping one another. Likewise, contact surfaces 16 and 24 are not meant to be understood as congruent surfaces.

First piston rod component 14 is preferably adjustable without a corresponding movement by second piston rod component 22. The advantageous adjustability of first piston rod component 14 may be independent of a position of second piston rod component 22. Likewise, second piston rod component 22 may also be adjustable without a corresponding movement of first piston rod component 14 and/or independently of a position of first piston rod component 14.

Thus, the brake booster device schematically illustrated in FIG. 1 implements a brake booster which acts on two piston rod components 14 and 22 which are adjustable independently of one another. In this configuration, first piston rod component 14 may be associated with a first boundary surface F1, along which an adjustment of first piston rod component 14 causes a variation in volume of variable (in terms of its size) pressure chamber 21 of brake master cylinder 20. This may also be described as a force which is transmitted to first piston rod component 14 opposing the pressure in pressure chamber 21 of brake master cylinder 20 at first boundary surface F1. Likewise, second piston rod component 22 may also be associated with a second boundary surface F2, at which surface braking into pressure chamber 21 of brake master cylinder 20 may occur with the aid of the force transmitted to second piston rod component 22. Hence, the independent adjustability of piston rod components 14 and 22 causes a variability of the brake application surface into pressure chamber 21 of brake master cylinder 20. The resulting advantages are discussed in greater detail below.

In the specific embodiment shown, second piston rod component 22 has a continuous recess 26 into which the first piston rod component at least partially protrudes. First piston rod component 14 is adjustably situated within continuous recess 26. Additional positioning options for the two piston rod components 14 and 22 are described in greater detail below.

The two piston rod components 14 and 22 protrude into an opening of brake master cylinder 20. To prevent seepage of brake fluid along an opening edge 28 of the opening, a sealing element 30, such as a sealing ring, may be positioned between opening edge 28 and second piston rod component 22. Likewise, seepage of fluid through continuous recess 26 is preventable by positioning a second sealing element 32, such as a sealing ring, within continuous recess 26 between second piston rod component 22 and first piston rod component 14.

In one advantageous specific embodiment, the brake booster device includes an input rod component 34 on which a brake actuation element 36 is mountable in such a way that a driver braking force Fb exerted on brake actuation element 36 is transmittable to input rod component 34. Mountable brake actuation device 36 may be a brake pedal, for example. Instead of a brake pedal, a differently designed brake actuation element 36 may also be mounted on input rod component 34.

Input rod component 34 is preferably at least temporarily in (force transmitting) contact with first piston rod component 14 in such a way that driver braking force Fb is transmittable at least partially to first piston rod component 14, while an at least partial transmission of driver braking force Fb to second piston rod component 22 is prevented. Prevention of at least a partial transmission of driver braking force Fb to second piston rod component 22 is not to be understood as an active process. Instead, input rod component 34 may at least temporarily contact first piston rod component 14 in such a way that no driver braking force Fb is transmitted to second piston rod component 22.

In the brake booster device schematically illustrated in FIG. 1, first piston rod component 14 is movable by driver braking force Fb (assisted by actuator device 12). Conversely, second piston rod component 22 is movable with the aid of actuator device 12 with no exertion of force by the driver.

In particular, when actuator device 12 is present in a deactivated state, first piston rod component 14 may be at least partially moved into the brake master cylinder with the aid of the at least partially previously transmitted driver braking force Fb. The advantageously split design of the piston rod in this case has the advantage that in the event actuator device 12 becomes functionally impaired, only first piston rod component 14 is movable with the aid of an actuation of brake actuation element 36, while second piston rod component 22 remains in a certain position in spite of the actuation of brake actuation element 36 by the driver. Hence, the driver is not required to brake into pressure chamber 21 of brake master cylinder 20 using the entire brake application surface equal to the sum of the boundary surfaces F1+F2, but merely a reduced brake application surface equal to first boundary surface F1. In this way, a stronger braking effect is created with the aid of a changed hydraulic transmission even though driver braking force Fb remains the same. This may also be described as driver braking force Fb causing a greater pressure buildup in brake master cylinder 20 as a result of the reduced brake application surface equal to first boundary surface F1.

Figure 2:
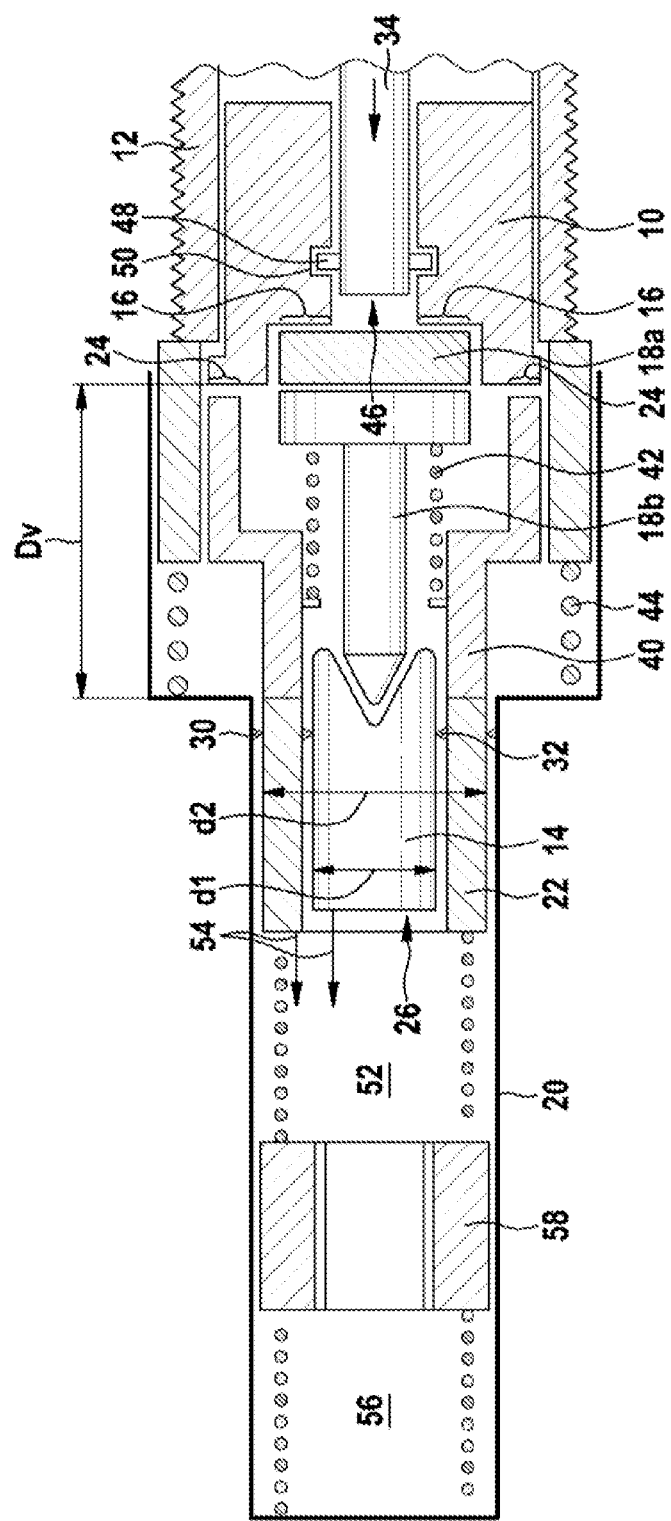
FIG. 2 shows a schematic representation of one second specific embodiment of the brake booster device.

FIG. 2 shows a schematic representation of one second specific embodiment of the brake booster device.

The brake booster device schematically shown in FIG. 2 includes the components previously described above. As is apparent from FIG. 2, first connecting component 18a and 18b may also be designed in multiple parts. In particular, first connecting component 18a and 18b includes a reaction disk 18a and a connecting piston 18b. In addition to first connecting component 18a and 18b, a second (single piece or multi-piece) connecting component 40 may also be positioned between second piston rod component 22 and booster body 10, by way of which the second force transmission contact is ensured, second connecting component 40 contacting second contact surface 24 of booster body 10. To ensure a reliable resetting of first connecting component 18a and 18b and/or second connecting component 40 in a starting position when the brake actuation element (not delineated) is not actuated, a first return spring 42 may be associated with first connecting component 18a and 18b and a second return spring 44 may be associated with second connecting component 40.

Input rod component 34 may by guided through a central bore of booster body 10. Seepage of fluid may be prevented with the aid of a sealing element 48, such as a sealing ring, situated in center bore 46. In particular, a sealing element 48 in the form of a sealing ring may be fixed in a simple manner in a preferred operating position with the aid of a groove 50 formed in booster body 10 or in input rod component 34.

In the specific embodiment shown, the brake booster device is mounted on a brake master cylinder 20 designed as a tandem brake master cylinder. In addition to a first pressure chamber 52 into which first piston rod component 14 and second piston rod component 22 may be at least partially moved, each in a common adjustment direction 54, the brake master cylinder so designed also includes a second pressure chamber 56. A floating piston component 58 is insertable at least partially into second pressure chamber 56. It is noted that neither first piston rod component 14 nor second piston rod component 22 is understood to mean a floating piston component 58.

Instead, the two piston rod components 14 and 22 are designed to jointly control a first internal pressure in first pressure chamber 52, while a second internal pressure may be adjusted/fixed in second pressure chamber 56 with the aid of floating piston component 58.

Thus, the advantageously designed brake booster device may also be used together with a brake master cylinder 20 designed as a tandem brake master cylinder. It is noted, however, that the advantageous brake booster device may also be used with a brake master cylinder 20 having just one pressure chamber 52, into which the two piston rod components 14 and 22 are insertable.

First piston rod component 14 may have a diameter d1 which, for example, is equal to half of a second diameter d2 of second piston rod component 22. In this case, a comparatively high translation of driver braking force Fb into a pressure increase is ensured, even given a functional impairment of the actuator device in which internal pressure in brake master cylinder 20 may only be increased via driver braking force Fb. However, the dimensions of piston rod components 14 and 22 are not limited to the exemplary diameters d1 and d2 reproduced herein. (Even the lengthening diameter Dv delineated in FIG. 2 is to be interpreted as solely exemplary.)

Figure 3A:
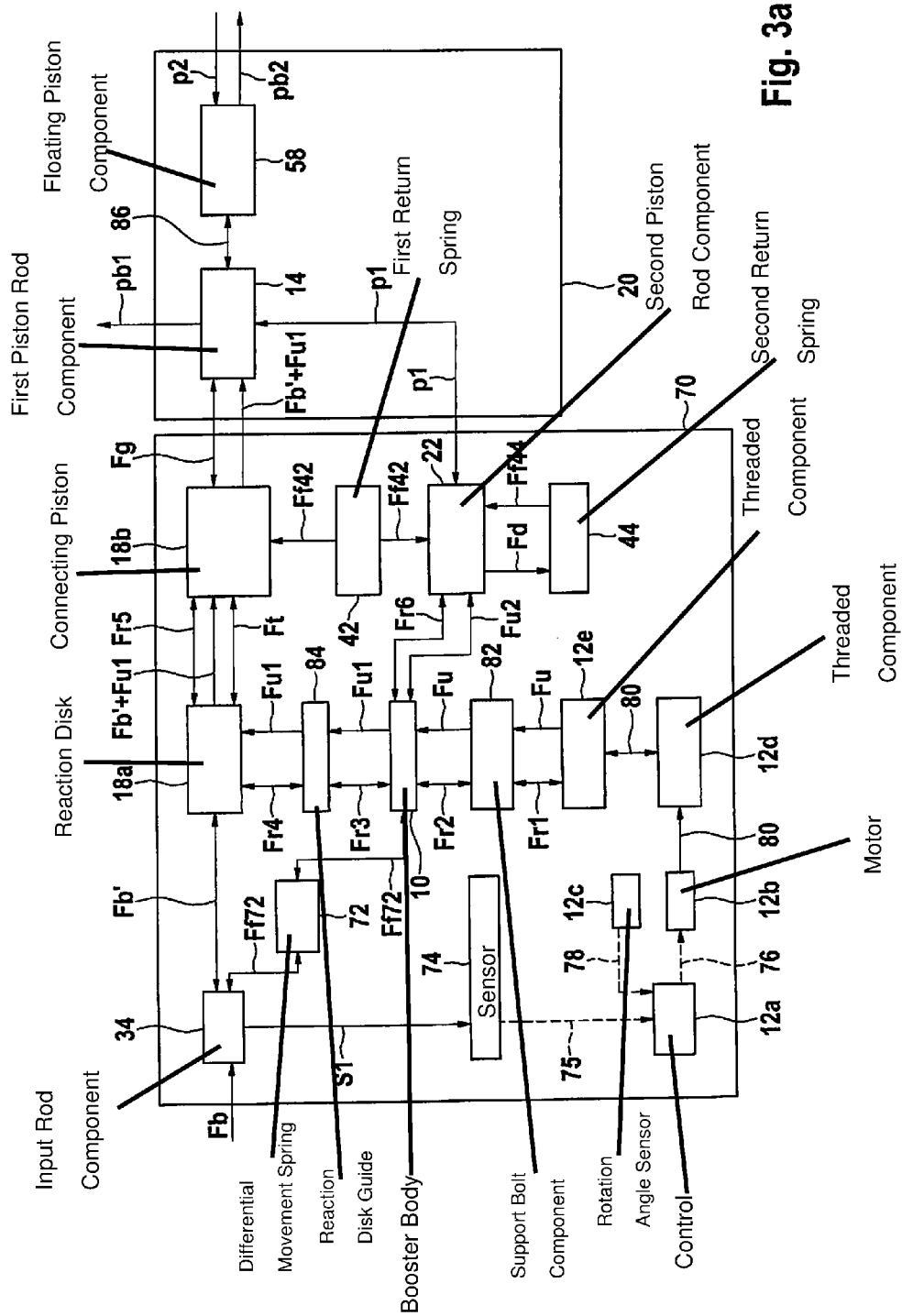
FIGS. 3a and 3b show functional diagrams to represent one third specific embodiment of the brake booster device.
Figure 3B:
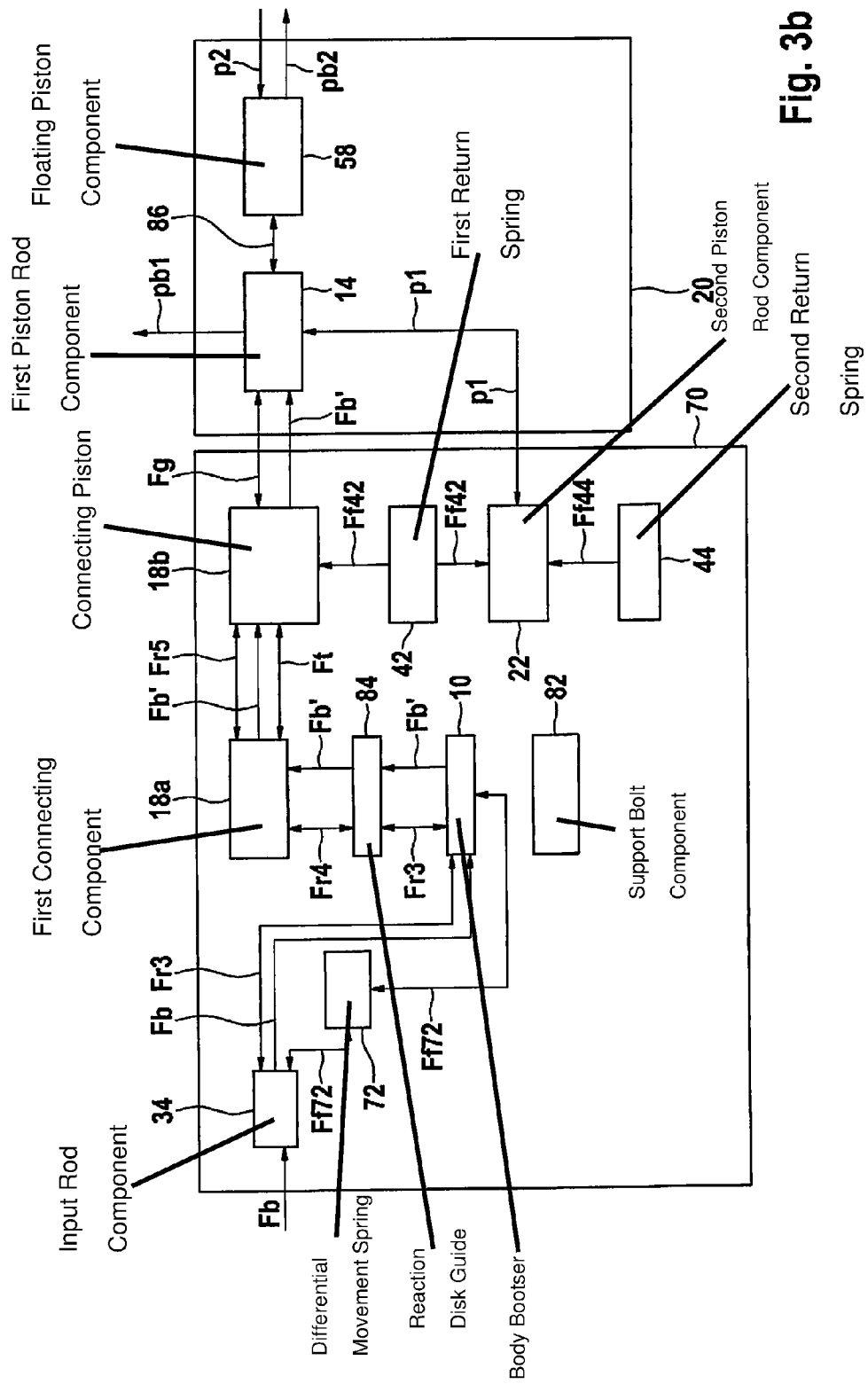

FIGS. 3a and 3b show functional diagrams for representing one third specific embodiment of the brake booster device.

Brake booster device 70 schematically illustrated in FIGS. 3a and 3b is shown in different functional states. FIG. 3a illustrates the functionality of brake booster device 70 in which the applicability of brake booster actuators is ensured. In contrast, FIG. 3b shows the functionality of brake booster device 70 in the event of a functional impairment, such as a failure, of the brake booster actuators.

An input rod component 34 is adjustable with the aid of a driver braking force Fb, both when the functionality of the brake booster actuators is ensured as well as when the brake booster actuators are functionally impaired. In such a case, at least a part Fb' of driver braking force Fb is transmitted to a reaction disk 18a. A differential-movement spring 72 which is situated between input rod component 34 and booster body 10 of brake booster device 70 may be compressed against a spring force Ff72.

In the function mode illustrated in FIG. 3a in which the functionality of the brake booster actuators is ensured, the actuation of input rod component 34 is also ascertainable with the aid of a sensor 74, such as a braking force sensor. For example, sensor 74 ascertains a sensor value S1 corresponding to driver braking force Fb. Sensor 74 then outputs a control signal 76 corresponding to sensor value S1 to a control 12a of an actuator device. Control 12a of the actuator device may be designed to provide a voltage signal 76 corresponding to sensor signal 75 to a motor 12b of the actuator device. Optionally, control 12a is also designed, when providing voltage signal 76 to motor 12b, to take into account a rotation angle signal 78 of a rotation angle sensor 12c of the actuator device mounted on motor 12b.

Motor 12b activated by control 12a exerts a torque 80 on threaded components 12d and 12e of the actuator device. By actuating threaded components 12d and 12e of the actuator device, at least one brake-boosting force Fu is transmittable to a support bolt component 82. In this case, the support bolt component 82 is adjusted counter to a friction force Fr1 in such a way that brake-boosting force Fu is transmitted to booster body 10 and booster body 10 is adjusted counter to a friction force Fr2 with the aid of brake-boosting force Fu.

A first contact surface of booster body 10 contacts a reaction disk guide 84 in such a way that reaction disk guide 84 is adjusted counter to a friction force Fr3 by at least the first partial brake-boosting force Fu1 transmitted thereto. By adjusting reaction disk guide 84, first partial brake-boosting force Fu1 is transmitted to reaction disk 18a previously cited above. In such a case, the reaction disk may be deformed against an elastic force Fr4. At the same time, when the braking actuation element is actuated while the actuator device is in a functionally ensured state, reaction disk 18a transmits the sum of the at least partially transmitted driver braking force Fb' and the first partial brake-boosting force Fu1 (total force Fb'+Fu1) to the above cited connecting element 18b and further to a first piston rod component 14. (The adjustment movement of connecting element 18b, with the aid of the total force Fb'+Fu1 transmitted thereto, may counteract an inertial force Ft and/or a friction force Fr5).

First piston rod component 14 may be at least partially moved into a first pressure chamber of brake master cylinder 20 with the aid of the total transmitted force Fb'+Fu1. Counteracting the movement of first piston rod component 14 into the first pressure chamber is a first pressure p1 prevailing therein, or a corresponding force Fg counter to first pressure p1. As a result of the movement of first piston rod component 14 into the first pressure chamber of brake master cylinder 20, first pressure P1 is increased, and thus a first braking pressure pb1 is built up in at least one first brake caliper hydraulically connected to the first pressure chamber.

Moreover, first piston rod component 14 may be connected to a floating piston 58 via a connecting component 86 in such a way that as first piston rod component 14 is moved into the first pressure chamber, floating piston 58 may be at least partially moved into a second pressure chamber. Counteracting the movement of floating piston 58 into the second pressure chamber is a second pressure p2. With the aid of the movement of floating piston 58 into the second pressure chamber, pressure p2 may be increased in such a way that a second braking pressure pb2 may be built up in at least one second brake caliper hydraulically connected to the second pressure chamber.

Booster body 10 also contacts a second piston rod component 22 in such a way that a second partial braking assist force Fu2 is transmittable to second piston rod component 22 and second piston rod component 22 is insertable against spring forces Ff42 and Ff44 of previously described springs 42 and 44 into the first pressure chamber of brake master cylinder 20. (Here, spring 44 in particular may be easily compressed by a deformation force Fd). With the movement of second piston rod component 22 into the first pressure chamber of brake master cylinder 20, first pressure p1 prevailing therein may be further increased so that first braking pressure pb1 transmitted to the at least one first brake caliper may also be increased by second partial braking assist force Fu2. Likewise, second pressure p2 and second braking pressure pb2 may also be increased by the additional pressure build-up in the first pressure chamber of brake master cylinder 20.

FIG. 3b shows the functional diagram for the actuator device when it is in a functionally impaired state. In this state, no braking assist force Fu may be exerted on booster body 10 with the aid of the actuator device. However, the first piston rod component may still be adjusted with the aid of the driver braking force Fb to which the latter is at least partially applied. While the second piston rod component remains in a constant position, first pressure p1 prevailing in the first pressure chamber may still be increased with the aid of the adjustment of first piston rod component 14 and second pressure p2 prevailing in the second pressure chamber may still be increased via the connecting component. Instead of a braking into the first pressure chamber at the boundary surfaces of both piston rod components 14 and 22, braking into the first pressure chamber occurs solely with the boundary surface of first piston rod component 14.

The reduced brake application surface resulting from the actuator device being present in a functionally impaired state may produce an improved force to pressure translation ratio. Because of the comparatively high force to pressure translation ratio achievable, the driver is able, with the aid of driver braking force Fb, to effect a comparatively high first pressure p1 in the first pressure chamber of brake master cylinder 20 and, by association, to also effect a comparatively high first braking pressure pb1 in the at least one first brake caliper. Likewise, due to the advantageous force to pressure translation ratio, a comparatively high second pressure p2 and a comparatively high second braking pressure pb2 may also be implemented with the aid of driver braking force Fb.

Figure 4:
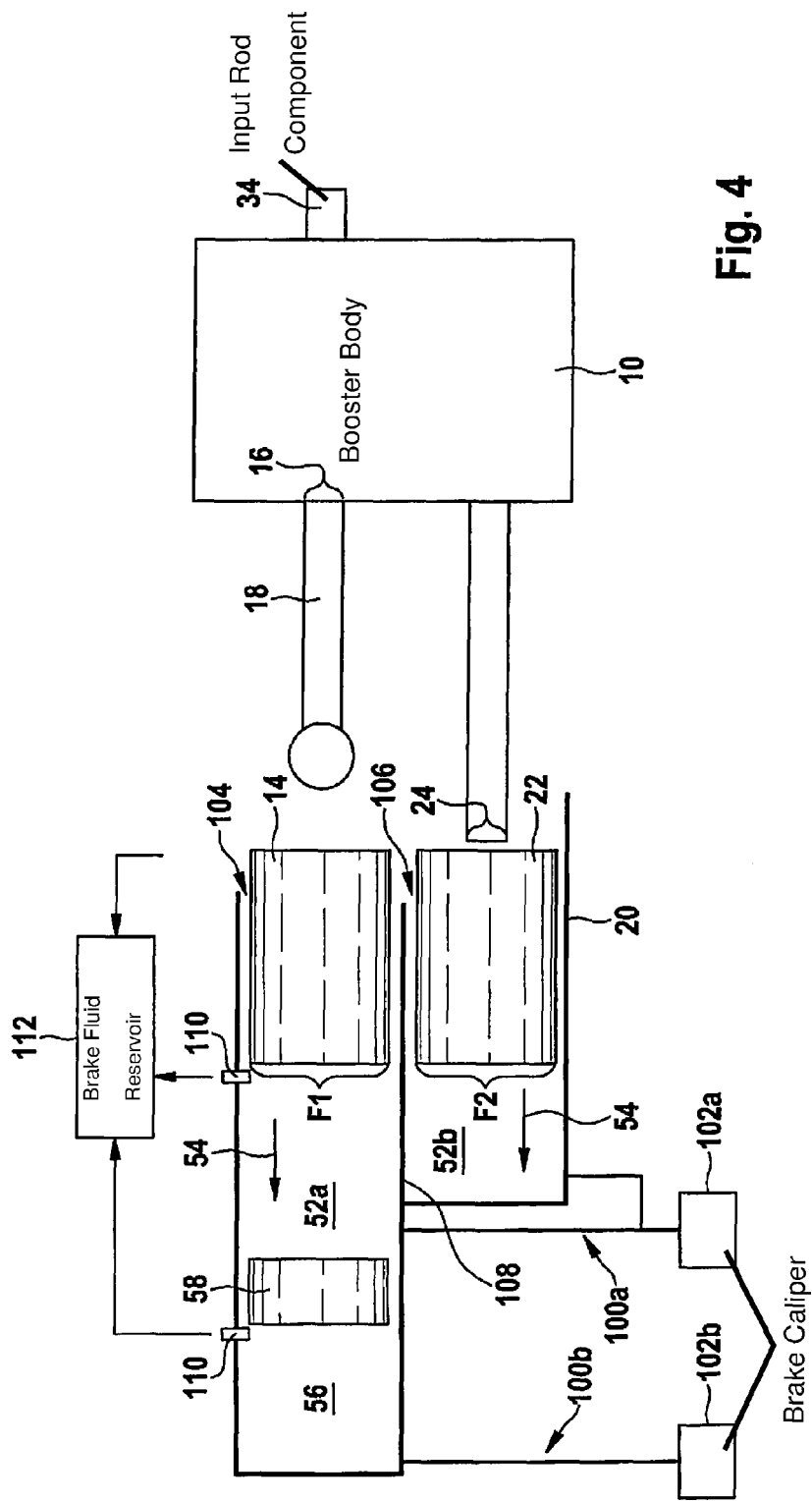
FIG. 4 shows a schematic representation of one specific embodiment of the power booster.

FIG. 4 shows a schematic representation of one specific embodiment of the power booster.

The power booster schematically illustrated in FIG. 4 includes a brake booster device and a brake master cylinder 20. The power booster may be used in a braking system having at least one brake circuit 100a and 100b, each including at least one brake caliper 102a and 102b. Since, however, the usability of the power booster is not limited to a specific design of the at least one brake circuit 100a and 100b, the individual components of the at last one brake circuit 100a and 100b are not further discussed.

In the specific embodiment shown, first piston rod component 14 is adjustable in an adjustment direction 54 through a first opening 104 of brake master cylinder 20, while second piston rod component 22 is adjustable in adjustment direction 54 through an opening 106 of brake master cylinder 20. This may also be described as first piston rod component 14 protruding into a first partial pressure chamber 52a of brake master cylinder 20 so that a first partial residual volume of first partial pressure chamber 52a fillable with a fluid is variable with the aid of an adjustment of first piston rod component 14, while second piston rod component 22 protrudes into a second partial pressure chamber 52b of brake master cylinder 20 in such a way that a second partial residual volume of second partial pressure chamber 52b fillable with a fluid is variable with the aid of an adjustment of second piston rod component 22. Formed between first partial pressure chamber 52a and second partial pressure chamber 52b is a continuous or discontinuous partition 108.

The two partial pressure chambers 52a and 52b may be considered as subunits of a common pressure chamber, provided an exchange of fluid between both partial pressure chambers 52a and 52b is ensured. In this case, a common first pressure is adjustable in both partial pressure chambers 52a and 52b. Thus it is also sufficient to connect just one of the two partial pressure chambers 52a and 52b to a brake fluid reservoir 112 via an orifice bore 110.

The exchange of fluid between the two partial pressure chambers 52a and 52b may be ensured, for example, by the formation of at least one flow-through opening in discontinuous partition 108. In a continuous partition 108 it is also possible for both partial pressure chambers 52a and 52b to be tied/connected to one common first brake circuit 100a. In this case, the exchange of fluid between the two partial pressure chambers 52a and 52b is possible, provided neither of the two partial pressure chambers 52a and 52b are decoupled from first brake circuit 100a by the closing of a cut-off valve.

In the specific embodiment shown, brake master cylinder 20 is designed as a tandem brake master cylinder which, in addition to first partial pressure chamber 52a and second partial pressure chamber 52b, together forming a first pressure chamber, also includes a second pressure chamber 56. It is noted, however, that the design of brake master cylinder 20 described herein as a tandem brake master cylinder is purely optional. Moreover, input rod component 34 may also be used as first connecting component 18.

The specific embodiments of the brake booster device and of the power booster described above may be easily designed using a selection of dimensions of their components in such a way that even at a driver braking force of 500N, a vehicle deceleration of 2.44 m/s$^2$ is achievable, even if the actuator device is functionally significantly impaired, as a result of which no brake-boosting force may be supplied. In all specific embodiments relatively high decelerations may be achieved in the event of failure of the actuator device. In addition, in all specific embodiments brake master cylinder 20 may be designed without regard to the deceleration achievable in the event of failure of the actuator device.

A further advantage of the above-described specific embodiments of the brake booster device and the power booster is that prompting the brake system to meet additional demands, such as generating a vehicle deceleration of 6.44 m/s$^2$ at a driver braking force of 500N, may be accomplished even when an ignition key has been removed. Moreover, the above described technology may be used to manufacture brake booster devices of reduced complexity.

The advantageous manufacturing methods are schematically illustrated with reference to the specific embodiments of the brake booster device and power booster described above. Thus, no additional description of the manufacturing methods is provided.

What is claimed is:

1. A brake booster device for a braking system of a vehicle, comprising:
    a booster body to which a brake-boosting force is exerted with the aid of an actuator device in such a way that the booster body is adjusted with the aid of the brake-boosting force;
    a first piston rod component to which the brake-boosting force is at least partially transmitted via one of (i) a first force-transmitting contact between the first piston rod component which contacts the booster body at a first contact surface or (ii) a first connecting component which contacts the first piston rod component and the first contact surface of the booster body, in such a way that the first piston rod component is at least partially adjusted;
    a second piston rod component to which the brake-boosting force is at least partially transmitted via one of (iii) a second force-transmitting contact between the second piston rod component which contacts the booster body at a second contact surface and the booster body or (iv) a second connecting component which contacts the second piston rod component and the second contact surface of the booster body, in such a way that the second piston rod component is adjusted together with the first piston rod component; and
    an input rod component on which a brake actuation element is mounted, wherein a driver braking force exerted on the brake actuation element bypasses the booster body and is transmitted to the input rod component, wherein:

the driver braking force is applied to the first piston rod component via the input rod component while the input rod component bypasses the booster body.

2. The brake booster device as recited in claim 1, wherein the input rod component is at least temporarily in contact with the first piston rod component in such a way that the driver braking force is at least partially transmitted to the first piston rod component, while at least partial transmission of the driver braking force to the second piston rod component is prevented.

3. The brake booster device as recited in claim 2, wherein the first piston rod component is adjusted with the aid of the driver braking force transmitted at least temporarily to the first piston rod component when the actuator device is present in a deactivated state.

4. The brake booster device as recited in claim 2, wherein the second piston rod component includes a continuous recess, and the first piston rod component is adjustably situated at least partially within the continuous recess.

5. The brake booster device as recited in claim 2, wherein the first piston rod component is adjusted in an adjustment direction through a first opening of a brake master cylinder, and the second piston rod component is adjustable in an adjustment direction through a second opening of the brake master cylinder.

6. A power booster for a braking system of a vehicle, comprising:
a brake master cylinder; and
a brake booster device having:
a booster body to which a brake-boosting force is exerted with the aid of an actuator device in such a way that the booster body is adjusted with the aid of the brake-boosting force;
a first piston rod component to which the brake-boosting force is at least partially transmitted via one of (i) a first force-transmitting contact between the first piston rod component which contacts the booster body at a first contact surface or (ii) a first connecting component which contacts the first piston rod component and the first contact surface of the booster body, in such a way that the first piston rod component is at least partially adjusted;
a second piston rod component to which the brake-boosting force is at least partially transmitted via one of (iii) a second force-transmitting contact between the second piston rod component which contacts the booster body at a second contact surface and the booster body or (iv) a second connecting component which contacts the second piston rod component and the second contact surface of the booster body, in such a way that the second piston rod component is adjusted together with the first piston rod component; and
an input rod component on which a brake actuation element is mounted, wherein a driver braking force exerted on the brake actuation element bypasses the booster body and is transmitted to the input rod component, wherein:
the driver braking force is applied to the first piston rod component via the input rod component while the input rod component bypasses the booster body.

7. The power booster as recited in claim 6, wherein:
the first piston rod component and the second piston rod component protrude into a first pressure chamber of the brake master cylinder in such a way that a residual volume of the first pressure chamber for filling with a fluid is variable with the aid of an adjustment of at least one of the first piston rod component and the second piston rod component; and
the brake master cylinder includes a second pressure chamber into which a floating piston component protrudes in such a way that a second residual volume of the second pressure chamber for filling with a fluid is variable with the aid of an adjustment of the floating piston component.

8. The power booster as recited in claim 6, wherein:
the first piston rod component protrudes into a first partial pressure chamber of the brake master cylinder in such a way that a partial residual volume of the first partial pressure chamber for filling with a fluid is variable with the aid of an adjustment of the first piston rod component; and
the second piston rod component protrudes into a second partial pressure chamber of the brake master cylinder, which is separated from the first partial pressure chamber by a partition, in such a way that a second partial residual volume of the second partial pressure chamber for filling with a fluid is variable with the aid of an adjustment of the second piston rod component.

9. The power booster as recited in claim 6, wherein the braking system includes at least one brake.

10. A method for manufacturing a brake booster device for a braking system of a vehicle, comprising:
mounting a booster body in such a way that during an operation of the brake booster device with the aid of an actuator device a brake-boosting force is exerted on the booster body in such a way that the booster body is adjusted with the aid of the brake-boosting force;
positioning a first piston rod component at a first contact surface of the booster body or at a first connecting component contacting the first contact surface of the booster body in such a way that during operation of the brake booster device the brake-boosting force is at least partially transmitted to the first piston rod component in such a way that the piston rod component is adjusted;
additionally positioning a second piston rod component at a second contact surface of the booster body or at a second connecting component contacting the second contact surface of the booster body in such a way that during operation of the brake booster device the brake-boosting force is at least partially transmitted to the second piston rod component in such a way that the second piston rod component is adjusted, together with the first piston rod component; and
exerting a driver braking force on a brake actuation element in order to transmit the driver braking force to an input rod component, the driver braking force bypassing the booster body, wherein:
the driver braking force is applied to the first piston rod component via the input rod component while the input rod component bypasses the booster body.

11. The method of claim 10, further comprising:
mounting the brake booster device on a brake master cylinder.

12. The method of claim 11, wherein at least one brake circuit is configured at the brake master cylinder.

13. The brake booster device as recited in claim 1, wherein the input rod component extends through a bore of the booster body and is movable relative to the booster body along the bore.

14. The power booster as recited in claim 6, wherein the input rod component extends through a bore of the booster body and is movable relative to the booster body along the bore.

15. The method as recited in claim 10, wherein the driver braking force translates the input rod component within a bore of the booster body.

* * * * *